Feb. 17, 1970　　　　G. B. DOREY　　　　3,495,549
RACK AND PINION SLIDING GATE ACTUATING MECHANISM
Filed Dec. 27, 1967　　　　　　　　　　　　2 Sheets-Sheet 1
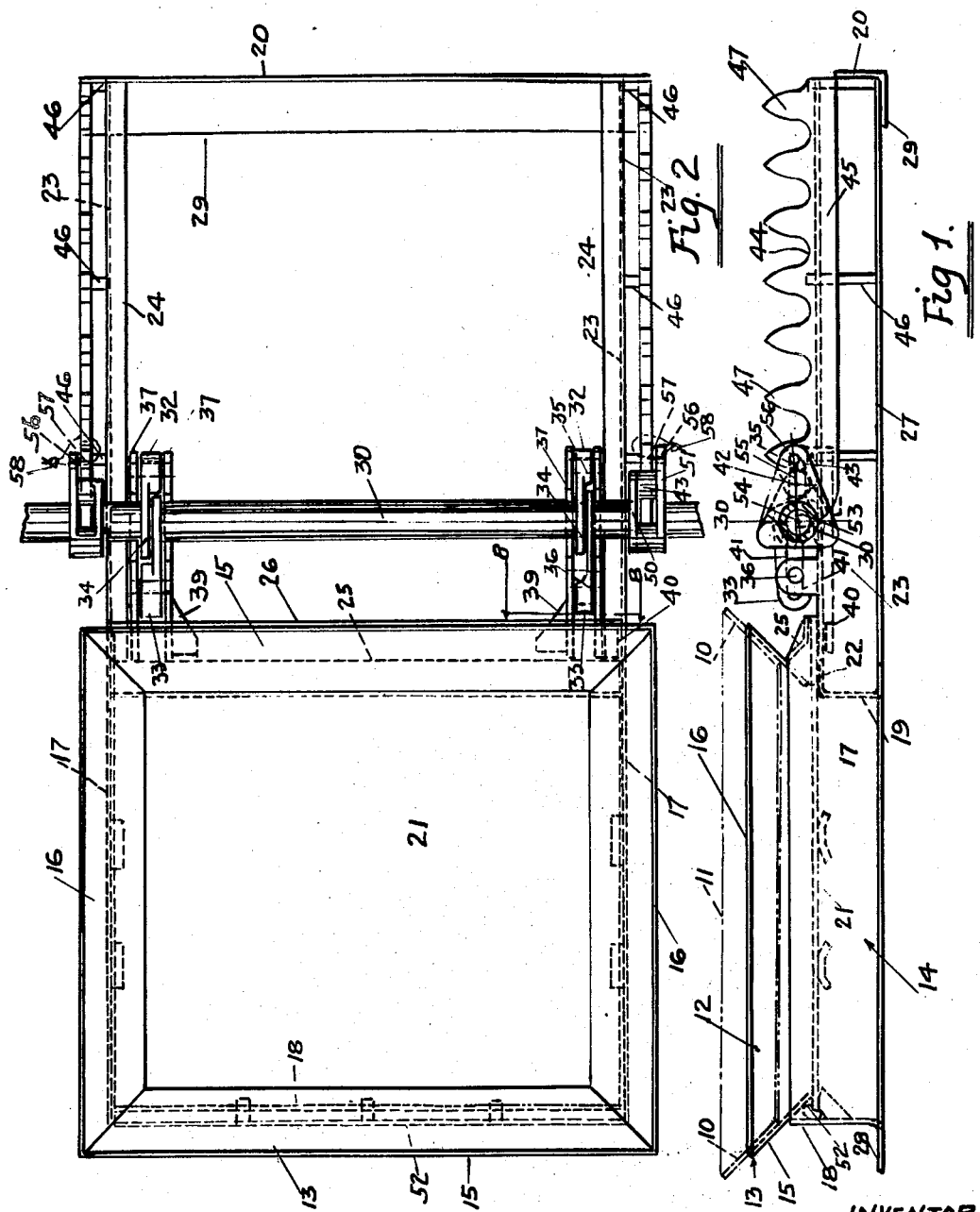
INVENTOR
George B. Dorey INVENTOR
George B Dorey United States Patent Office 3,495,549
Patented Feb. 17, 1970

3,495,549
RACK AND PINION SLIDING GATE ACTUATING MECHANISM
George B. Dorey, Westmount, Quebec, Canada, assignor to Continental Transport Appliances Limited, Montreal, Quebec, Canada, a company of Canada
Filed Dec. 27, 1967, Ser. No. 693,877
Int. Cl. B61d 7/02, 7/20, 7/26
U.S. Cl. 105—282                4 Claims

ABSTRACT OF THE DISCLOSURE

The improvement relates to mechanism for moving a sliding gate by rotation of an operating shaft moving conjointly with the gate in linked relation thereto and having eccentrically disposed cogs for cooperating engagement with rack elements whereby the gate is moved under the influence of eccentrically applied force culminating in an overcenter toggle locked relation at the termination of the gate closing movement.

---

The invention relates to an eccentrically operating mechanism for a sliding gate of a type generally employed for controlling discharge of lading from railway hopper cars.

FIELD OF THE INVENTION

The invention relates to improved means for moving a sliding gate such as commonly employed for controlling discharge of bulk lading from railway hopper cars and which have hitherto been usually operated by rack and pinion means or folding toggle linkage mechanisms. The trend to larger discharge openings with correspondingly increased travel of the gates now requires torque effort beyond the limitations of the conventional mechanisms of the type above referred to and it is a purpose of the present invention to provide high torque efficiency throughout the entire range of the gate movement by taking advantage of the eccentric toggle principle at various stages of the gate travel.

For the purpose of attaining sustained high torque efficiency reliance is placed on the use of eccentrically applied force consequent on unidirectional rotation of an operating shaft movable conjointly with the gate and preferably linked therewith, whereby the axis of the shaft constitutes the pivotal axis between the toggle components and wherein the linkage serves to retain the shaft in captive relation to the gate and rack elements.

SUMMARY OF THE INVENTION

The invention is predicated on mechanism incorporating a bodily movable rotatable shaft connected with the gate by means of oppositely extending links and having a plurality of radially spaced eccentrically positioned circularly shaped cogs adapted to successively engage with rack elements having complementary shaped seats for receiving the cogs with provision for restricting undue vertical movement of the shaft.

The operation of the mechanism is based on the application of eccentrically applied force and to this end the shaft is adapted to have turning movement about the axis of the cogs. The restricting provision employed is preferably in the form of oppositely extending links each having one end encircling the shaft and having the opposite end slotted for receiving bearing pivots carried by the gate on opposite sides of the shaft whereby the links in cooperation with the cog arms provide toggle action for forcing the cogs downwardly in the seats upon rotation of the shaft in either direction.

DESCRIPTION OF THE DRAWINGS

In the drawings FIGURE 1 is a longitudinal vertical side view of an outlet assembly embodying the invention as applied to the lower portion of a hopper of a railway hopper car wherein the hopper is indicated by conventional dot and dash lines.

FIGURE 2 is a plan view of the structure shown in FIGURE 1.

DESCRIPTION OF THE PREFERRED EMBODIMENT

Figure 4:
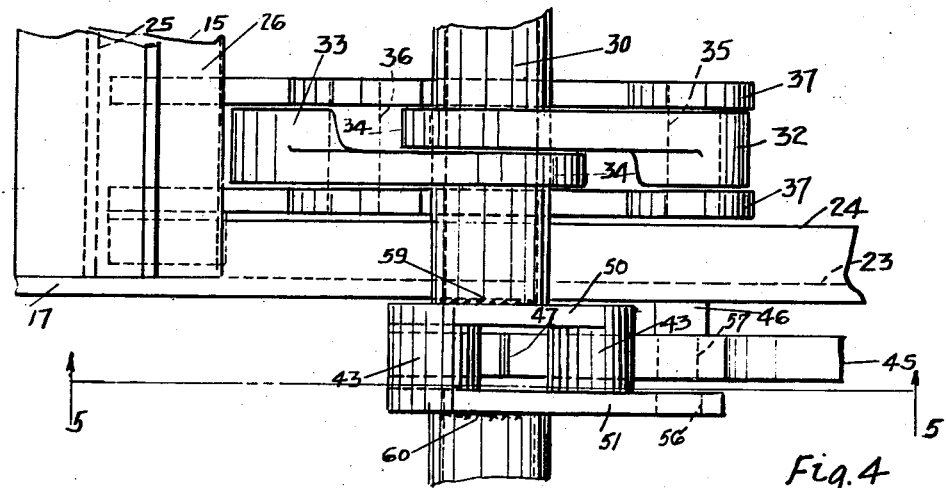
FIGURE 4 is a plan view of the structure shown in FIGURE 3.

In said drawings the lower portion of the hopper of a railway hopper car is indicated conventionally by sloping walls 10 and 11 which join at the corners to form an inverted truncate shaped hopper and said hopper carries an outlet assembly 12. The outlet assembly is preferably formed in two main sections including an upper portion 13 and a lower frame work portion 14.

The upper portion 13 includes inwardly downwardly sloping walls 15 and 16 adapted to overlie the walls 10 and 11 of the hopper. The upper portion 13 nests in the lower frame portion 14 which includes laterally spaced longitudinally extending walls 17—17 transversely united by walls 18, 19 and 20 to form a complete rigid frame. The walls 18 and 19 together with walls 17—17 form a foursided chutelike structure which definies the final discharge opening of the outlet. The walls 17—17 and end wall 18 connect with the sloping walls 15 and 16 and form a three-sided enclosure within which a sliding gate 21 is movable to closed position beneath the eaves of sloping walls 15 and 16.

The wall 19 is preferably of channel shape with an upper flange 22 lying beneath the gate 21. The side members 17—17 are extended beyond the discharge opening as indicated at 23—23 to support the gate in open position and said extensions are flanged inwardly at their upper end as indicated at 24 to form ledges on which the gate 21 is movable. The gate 21 in closed position extends beyond the flange 22 and said gate extension is overlaid by a reinforcing shield member 25 having a lower wall 26 extending slightly beyond the closed gate to guard against entrance of snow and ice.

The lower margin of walls 17 and 18 is reinforced by an outwardly extending marginal flange as indicated at 27 and 28 and the end member 20 includes a flange 29 adapted to underlie and connect with flange 27 of the side members 17.

The gate is adapted to be moved by means of a rotatable operating shaft 30 disposed adjacent the trailing end of the gate and connected therewith through the medium of oppositely extending links 32 and 33. The links 32 and 33 are disposed to encircle the shaft as seen at 34 and extend therefrom in opposite directions to connect with pivots as indicated at 35 and 36, respectively. The pivots 35 and 36 are carried by a pair of spaced walls 37—37 which in turn are secured to the extended end of the gate 21, being welded to the underside thereof as at 38 and further connected by means of a gusset plate 39. A bracket 40 extends laterally outwardly from the outer of the walls 37 to underlie the top flange 24 of the side extensions 23 and restrain the gate against excessive upward movement.

The links 32 and 33 are slotted as indicated at 41 for the accommodation of the pivots 35 and 36 to allow limited vertical movement of the shaft for a purpose as will hereinafter be apparent.

Translatory movement of the gate 21 by rotation of the shaft 30 is effected by eccentric movement thereof about axis 42 of radially spaced concentrically formed cogs 43 carried by the shaft and seating in a series of lengthwise spaced bearing pockets 44 of rack elements 45 carried by the extension members 23, said bearing pockets 44 being contoured on a radius centering about the axis 42 of the cogs 43 when seated in the pockets. The rack elements are spaced outwardly from the side walls of members 23 and are connected thereto by means of welded ribs 46. The rack elements 45 are preferably formed of drop forgings with finger-like upward projections 47 leading upwardly between the bearing pockets 44 on arcuate contours 48 radiating from the axis 42 of the cogs 43 and bearing pockets 44 on radius as indicated at 49. The cog structures each include a pair of disk-like members 50 and 51 spaced apart to accommodate the cogs 43 therebetween and straddle the rack elements 45.

A neoprene resilient gasket 52 is positioned between the leading end of the gate and the end wall 18 and in order to automatically compress the gasket and retain same under compression with the gate in closed position a toggle locking feature is incorporated in the mechanism which becomes effective by continued shaft rotation at the end of the gate closing movement. In order to effect said toggle locked closure the distal end of each rack element 45 proximate to the discharge area is curved on a contour concentrically related to the axis of the associated bearing pocket in order to permit the leading cog 43 to swing downwardly below the level of the bearing seats and provide an overcenter toggle locked condition at the end of the gate closing movement as best seen by reference to FIGURE 3.

Figure 3:
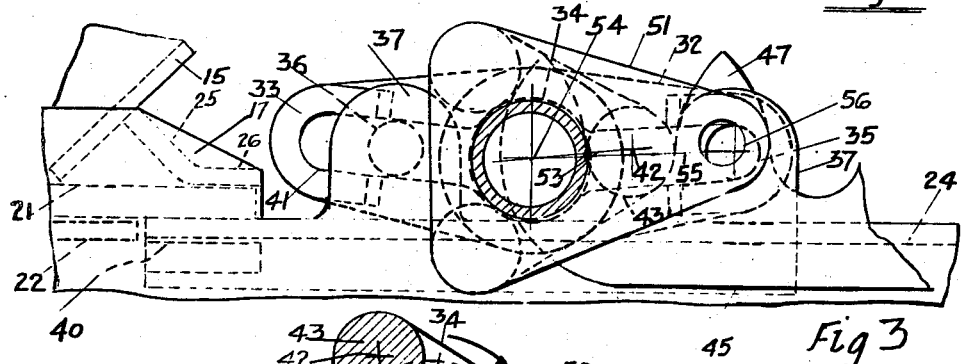
FIGURE 3 is a fractional view on an enlarged scale of the portion of FIGURE 1 showing the mechanism in overcenter toggle locked position for retention of the gate in closed and locked position.

In said FIGURE 3 it will be seen that a line 53 extending between axis 54 of the shaft and the axis 42 of the operating cog 43 lies above the line 55 joining the axes of the shaft and the associated link pivot 35. The outer disks 51 are each provided with an extension apertured at 56 for registering with an aligned aperture 57 in the adjacent rack element when the toggle members are in over center toggle locked position for receiving a sealing ribbon 58 through said openings.

It will be noted that continuity of the shaft is interrupted by the cog elements and it is therefore necessary to form the shaft in three sections, said sections being welded to the disk elements 50 and 51 as seen at 59 and 60. In order to facilitate assembly and assure alignment of the shaft sections it has been found desirable to employ hollow tubing and maintain alignment during fabrication by threading a rod through the hollow shafting and associated components.

Figures 6, 7:
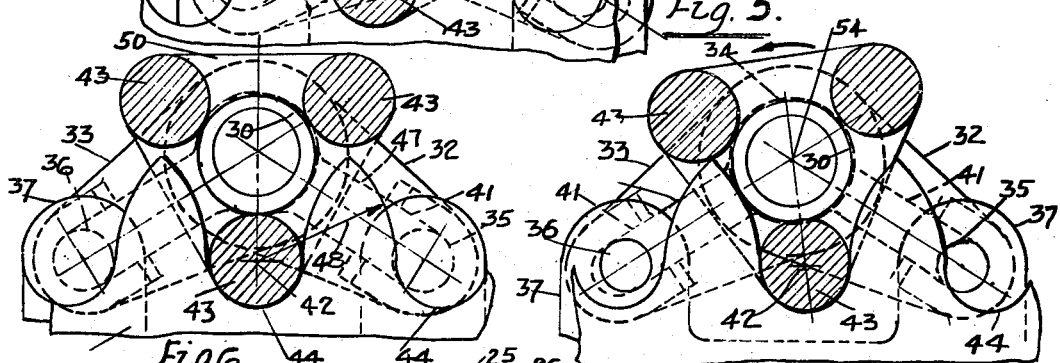
FIGURE 6 is a view similar to FIGURE 5 except that the shaft is shown as held captive in relation to a rack element in its uppermost position by the oppositely disposed links.
FIGURE 7 is a view similar to FIGURE 5 except that the shaft and links are positioned with the movement of the shaft in an anti-clockwise direction.
Figure 8:
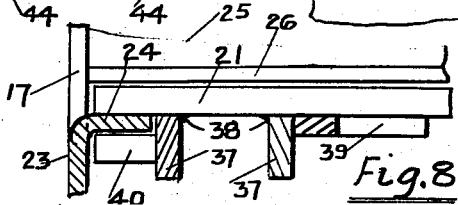
FIGURE 8 is a fractional vertical sectional view on an enlarged scale as taken on a line 8—8 of FIGURE 1 illustrating the retaining lug on the gate in relation to the supporting flange.

The operation and advantages of the mechanism may be best understood by reference to the sequence of movements involved in one opening and closing cycle of the gate. Assuming the gate in closed position with the mechanism in over center toggle locked position as viewed in FIGURES 1 and 3 wherein the end of the slot of link 32 is in bearing relation with its associated bearing pivot 35 and the end of the slot in the other link 33 is spaced from its pivot 36, it will be apparent that clockwise rotation of the shaft will tend to swing the shaft upwardly about the axis 42 of the settled cog 43. The initial clockwise rotation of the shaft will first rupture the sealing ribbon 58 before any appreciable gate movement is initiated and upon continued movement in the indicated direction the link 33 is moved outwardly into bearing contact with its associated pivot 36, the shaft meanwhile swinging upwardly as seen in FIGURE 6 and held against further upward displacement by the links 32 and 33 which swing upwardly with the shaft until contact is established with their pivots. The length of the links 32 and 33 and their relation to the other parts of the mechanical systems are such as to maintain at all times one or more cogs within the confines of the openings between the fingers of the rack element and prevent separation of the cogs from the rack elements.

Figure 5:
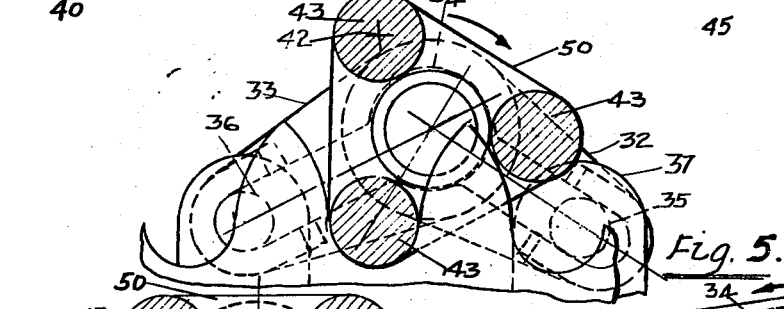
FIGURE 5 is a vertical sectional view as taken on a line 5—5 of FIGURE 4 showing the shaft positioned with the eccentrically disposed arm and one of the links in partially folded relation as movement of the shaft takes place in a clockwise direction.

From the position shown in FIGURE 6 the shaft may be swung in either a clockwise direction as seen in FIGURE 5 under control of link 33 or in anti-clockwise direction as seen in FIGURE 7 under control of link 32. It will be observed that irrespective of the direction of rotation the action will be conducive to forcing the cogs into engagement with the seats due to the jackknife folding action of the cog arms and links during the shaft rotation.

What is claimed as new is:

1. An outlet assembly having an opening for discharge of lading and a sliding gate for the opening movable to open position beyond said opening, means for moving the gate including:
   (a) a vertically displaceable rotatable shaft movable with the gate,
   (b) means for holding the shaft in relation to the gate for conjoint movement therewith,
   (c) cogs eccentrically mounted on the shaft,
   (d) rack means carried by the assembly having a series of bearing pockets adapted for successive engagement with the cogs upon rotation of the shaft.

2. The invention set forth in claim 1 wherein: the means for holding the shaft in relation to the gate include oppositely disposed link members encircling the shaft and having sliding pivoted connections on opposite sides of the shaft.

3. The invention set forth in claim 2 wherein the cogs are of circular contour and the axis thereof in combination with the axis of the shaft and the pivotal axis of the links constitute a two arm toggle adapted to knuckle to an over center toggle locked position for retaining the gate in closed position.

4. The invention set forth in claim 2 wherein the oppositely disposed links operate as stops to limit upward vertical displacement of the shaft.

References Cited

UNITED STATES PATENTS 2,993,452  7/1961  Dorey _____ 105—305 X
3,066,618  12/1962  Gunnison.

DRAYTON E. HOFFMAN, Primary Examiner

H. BELTRAN, Assistant Examiner

U.S. Cl. X.R.

105—294, 305